United States Patent Office 3,046,118

Patented July 24, 1962

3,046,118

PROCESS OF MAKING PRINTING PLATES AND LIGHT SENSITIVE MATERIAL SUITABLE FOR USE THEREIN

Maximilian Paul Schmidt, Wiesbaden-Biebrich, Germany, assignor, by mesne assignments, to Azoplate Corporation, Murray Hill, N.J., a corporation of New Jersey No Drawing. Filed Feb. 14, 1958, Ser. No. 715,222

Claims priority, application Germany Dec. 27, 1949

42 Claims. (Cl. 96—33)

This invention relates to light-sensitive materials suitable for the production of lithographic printing plates and for other purposes and in particular to positive working photosensitive materials of the type described in U.S. Patent application Serial No. 174,556, filed July 18, 1950, by Maximilian Paul Schmidt, and now abandoned.

The U.S. patent application Serial No. 174,556 referred to the preparation of photosensitive material by coating a specific type of water-insoluble diazo compounds on a suitable base material, said water-insoluble diazo compounds being derived from 2-diazo-naphthol-(1) or 1-diazo-naphthol-(2) and having the chemical constitution of esters or amides of a sulfoacid or a carboxylic acid of these diazo naphthols. This sensitized material is then exposed to light through a master to decompose the diazo compound in the light struck areas and convert it into an alkali-soluble compound which is then removed by washing with an alkaline solution. Thus a positive image of undecomposed diazo compound is obtained from a positive original and a negative image is obtained from a negative original. This image may be heated to make it receptive to greasy printing inks so that the exposed and developed material may be used as a lithographic plate. Exposure to heat may not be necessary in order to increase the receptiveness of the image for greasy ink, if a resin or fatty acid or both are incorporated in the light-sensitive layer with the diazo compound.

Now it has been found that receptive power for greasy printing inks can be obtained without heating the light-sensitive material to higher temperatures, by using light-sensitive layers containing water-insoluble diazo compounds which have in the molecule several, preferably two, naphthoquinone-(1,2)-diazide sulfonic acid residues (ortho-diazo-naphthol sulfonic acid residues), linked in the manner of an ester.

After the light-decomposition products are removed by means of alkali, from layers of these diazo compounds which have been exposed to light under a positive pattern, positive diazo images remain on the base. If the base is hydrophilic these positive diazo images can be used for direct printing of a rather large number of copies.

For example, zinc, aluminum, copper, brass or glass plates, lithographic stone, as well as superficially oxidized aluminum foils, etc. may be used as bases for the water insoluble light-sensitive diazo compound. If the image is to be used for lithographic printing the surface of the base should be hydrophilic so that after removal of the decomposed diazo compound, the background areas will accept water and repel greasy ink.

The images should be developed with weakly alkaline solutions. Good results are generally obtained by using 3–5% trisodium phosphate solutions or disodium phosphate solutions of somewhat higher concentration. Aqueous solutions of other alkalies as for example sodium carbonate or caustic soda may also be used. Organic solvents such as alcohol may be added to these alkaline solutions.

If, subsequently, the image is heated until a change of color occurs, or if resins or fatty acids or mixtures of both are incorporated into the light-sensitive layer, it has been found that the receptive power of the positive diazo image for greasy inks may be still further improved.

Diazo compounds which are especially suitable for the preparation of the light-sensitive layers are naphthoquinone-(1,2)-diazide sulfonic acid esters of the general formula

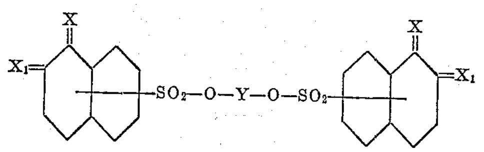

in which X and $X_1$ are $N_2$ or O, those attached to the same ring being different, and Y is an organic linkage containing at least one arylene, substituted arylene or heterocyclic radical.

Y may be formed from a dihydroxy compound such as are aromatic hydrocarbons with hydroxyl groups such as hydroquinone, 4,4′-dihydroxy-diphenyl, dihydroxy-naphthalene, β-dinaphthol, also hydroxyl groups containing aromatic hydrocarbon residues which are linked together for example by O, S, SO—, $SO_2$—, $CH_2$—, CO—, —CH=CH—, —$CH_2$—$CH_2$— or —N=N-groups, for example 4,4′-dihydroxy-diphenyl-ether, 4,4′-dihydroxy-diphenyl-sulphide, 4,4′-dihydroxy-diphenyl-sulfone, 4,4′-dihydroxy-diphenyl-methane, 2,2′-dihydroxy-1,1′-dinaphthyl-methane, 4,4′-dihydroxy-benzophenone, α,β-bis-(4-hydroxyphenyl)-ethane, β,β-bis-(4-hydroxyphenyl)-propane, furthermore aromatic hydrocarbon residues which are connected in ring-form and contain hydroxyl groups as for example 1,4-dihydroxy-anthraquinone and 2,7-dihydroxy-fluorene.

The connecting linkage can also be substituted with alkyl-, aryl-, aralkyl-, alkyloxy-, aryloxy-, nitro-, cyclohexyl groups or halogens. Also the naphthalene nucleus of the naphthoquinone-(1,2)-diazide residues can be substituted, for instance with halogen. However, sulfonic acid groups should be omitted. Also stronger basic groups, such as the amino- or dimethylamino groups, should preferably not be included because it is customary in the printing process to treat the printing plates with acids in order to keep the background clean.

The following compounds which are referred to in the following examples, represent diazo compounds which are useful according to the present invention.

Formula 1:

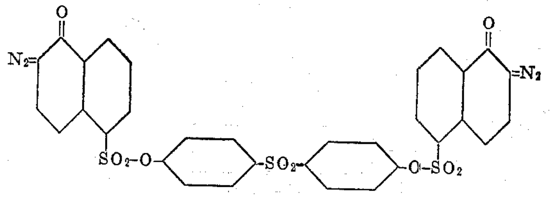

Formula 2:
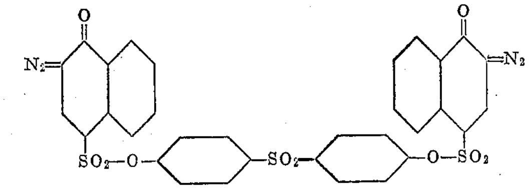
Formula 3:
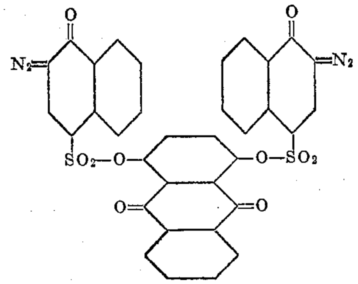
Formula 4:
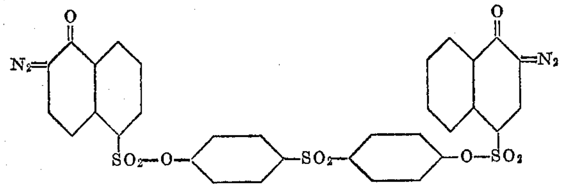
Formula 5:
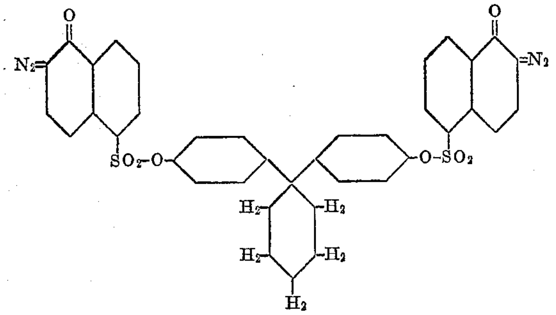
Formula 6:
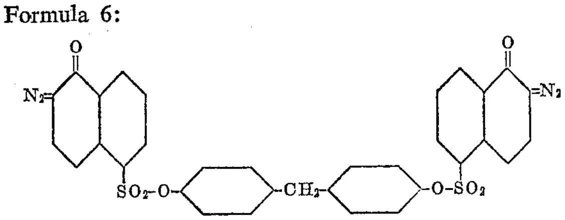
Formula 7:
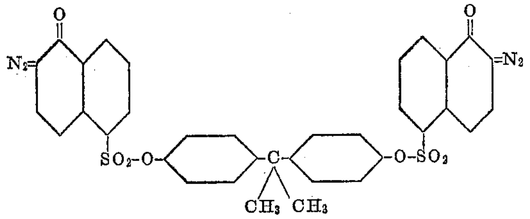
Formula 8:
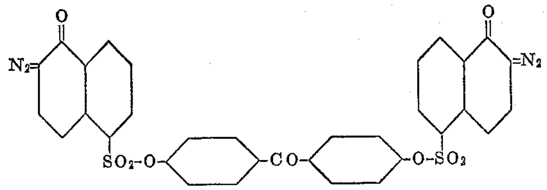
Formula 9:
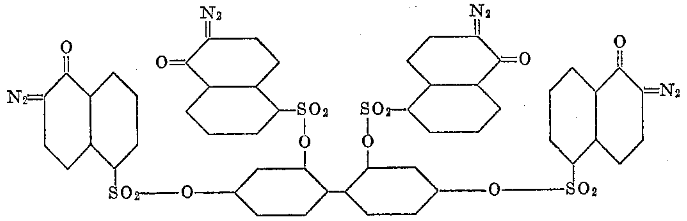
Formula 10:
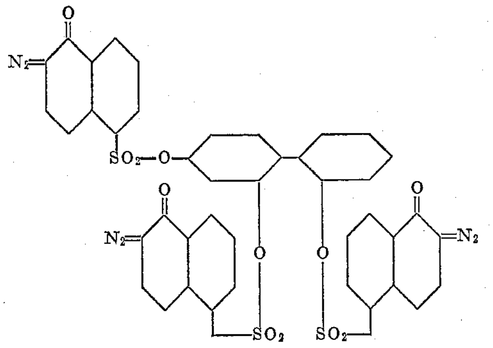
Formula 11:
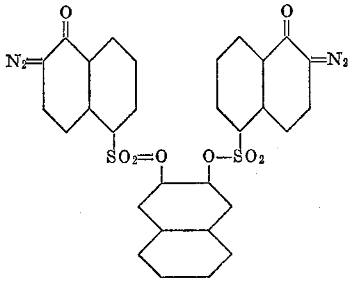
Formula 12:
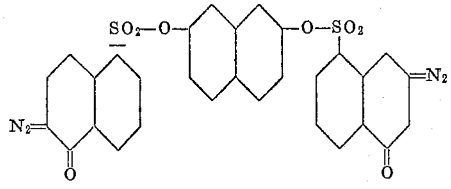
Formula 13:
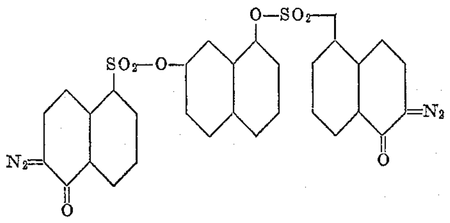

Formula 14:

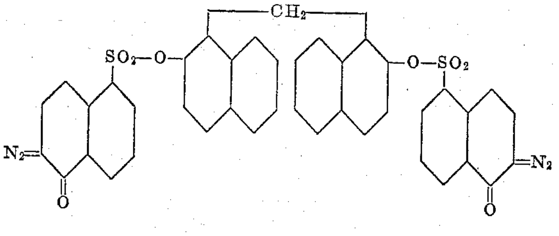

Formula 15:

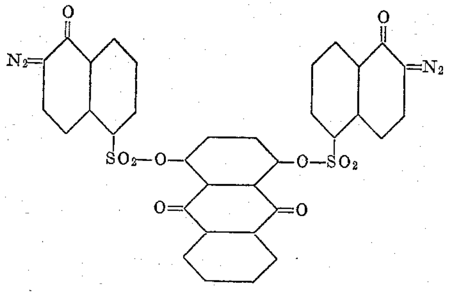

Formula 16:

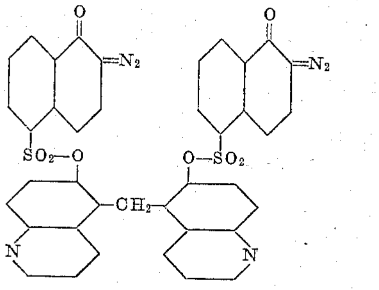

Formula 17:

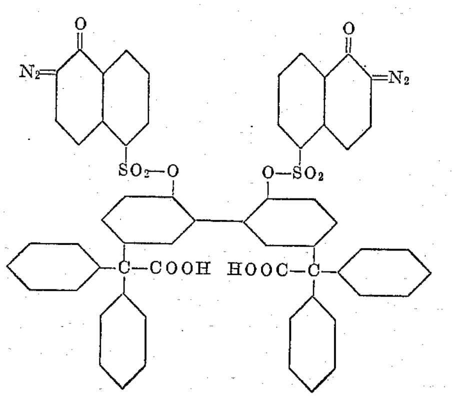

Formula 18:

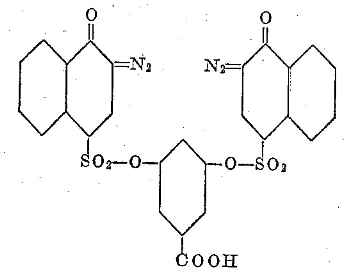

Formula 19:

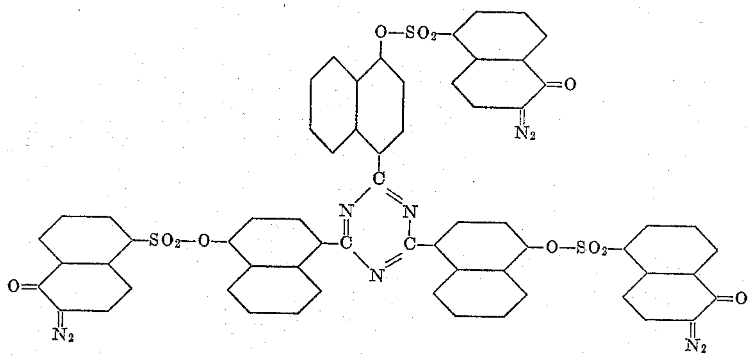

Formula 20:

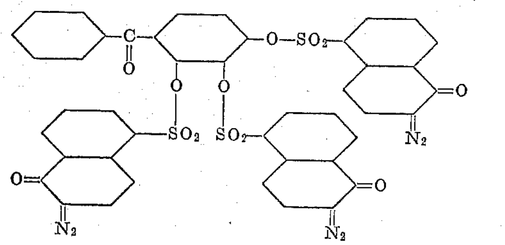

Formula 21:

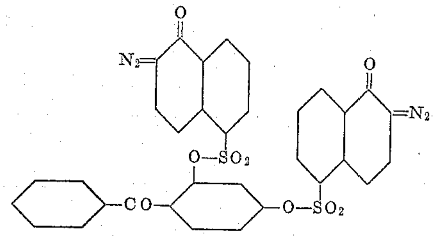

Most of the diazo compounds which may be used in accordance with this invention are not described in the literature. However, their preparation can be accomplished without particular difficulty by following known methods for their synthesis. In most cases they can be obtained simply by reacting 2 moles of a naphthoquinone-(1,2)-diazide-sulfochloride with 1 mole of the dihydroxy compound in an alkaline solution. A convenient solvent may be added if the hydroxy compound is only slightly water soluble. If the connecting element contains more than 2 hydroxyl groups in the molecule, a correspondingly higher number of moles of the naphthoquinone-(1,2)-diazide-sulfonic acid component must be added to the reaction mixture.

Most of the diazo compounds described are yellow products and in general it is difficult to dissolve them in the solvents which are commonly used. They dissolve more readily for example in dioxane, monomethylglycolether, monoethylglycolether, methylethylketone, pyridine bases or combinations of these solvents. It is advisable to use difficultly soluble products in combination with more readily soluble compounds. The use of combinations of compounds is often of advantage because crystalline eliminations may be avoided and smoother layers are obtained. Furthermore, the use of combinations of solvents may improve the clarity and smoothness of the layers as is known in the organic finishing art and in the preparation of lacquers and varnishes.

The diazo compounds described bleach out or decompose readily on exposure to light which is necessary in order to obtain a clean background. However, small amounts of other chemical substances, such as thiourea, thiosinamine, and weak acids, as is common practice in the positive diazotype process, may be added to the light-sensitive layer in order to improve the background of the print. Dyestuffs in small quantities may also be added in order to improve the visibility of the images.

After the image has been developed with an alkaline solution, the material may be completely exposed to light without any danger since the light-decomposition products also accept greasy ink and are suitable for printing. It will be appreciated that this is of great practical importance. In some cases the firmness of the printing images is even improved by exposure to light.

For the production of the light-sensitive material the diazo compound dissolved in an organic solvent, such as benzene or alcohol, is applied onto a support, for example a superficially oxidized aluminum foil, a thin layer being formed. It is important to produce a uniform and even light-sensitive layer of the diazo compounds on the layer and this can be realized advantageously by using solvents or mixtures of solvents which do not vaporize in a short time. Occasionally very good results as to the production of an uninterrupted strongly coherent layer very well sticking to the support are obtained by using a mixture of several different diazo compounds. Solutions which contain 1 to 3 percent of the diazo compounds are satisfactory for the manufacture of the light-sensitive layer.

The copies which have been obtained by the exposure to light of the coated material under a pattern are developed by means of alkaline solutions as much diluted as possible. Generally aqueous solutions containing 1 to 5 percent of disodium phosphate and trisodium phosphate respectively will be suited. Instead of them dilute solutions of other alkalies, such as soda or caustic soda, can often also be used and solvents, such as alcohol, can be added, if desired. The following data will enable any expert to comply with the requirements of practice: diazonaphthol-sulfonic acid esters can be developed with solutions of trisodium phosphate. As a rule the weakest alkali suitable for removing the light-decomposition products of the diazo compound should be used. The diazo compounds can be protected against actions coming from the developing alkaline solution by adding readily soluble alkali metal salts, such as sodium chloride, sodium bromide, and sodium sulfate to the developer.

The diazo compound images which have been developed on a metal or glass or stone support can be etched by means of acids, even after the images have been rubbed in with greasy ink. In this manner relief printing plates too can be produced.

Another object of the present invention consists in a modification of the above described process. This modification often leads to an improvement of the diazo compounds' power of fixing greasy inks and to an increase of the number of prints which can be produced by means of the printing plates obtained. The modification is characterized by the feature that the light-sensitive diazo compounds are coated onto the support in combination with resins soluble in alkalies or with solid fatty acids or mixtures of resins and fatty acids. Suitable products of this kind are, for example, the resins soluble in alkalies, such as colophony, shellac, and the synthetic resins soluble in alkalies. Small quantities of waxes, dyestuffs or resins insoluble in alkalies can be added. The fatty acids suited for the purpose of this invention must be solid and high molecular, such for example as stearic acid.

The following examples are inserted in order to illustrate the present invention but they are not intended to limit the scope thereof:

(1) 2 g. of the condensation product obtained from 2 moles of 2-diazonaphthol-(1)-5-sulfochloride (naphthoquinone-(1,2)-diazide-(2)-5-sulfochloride) and 1 mole of 4,4'-dihydroxy-1,1'-diphenyl-sulfone which condensation product corresponds with the Formula 1 are dissolved in 100 cc. of a warm solution containing equal parts of dioxane and pyridine. After cooling to room temperature the solution containing the condensation product is whirl-coated on a superficially oxidized aluminum foil. The light-sensitive layer is then exposed to light under a positive pattern. Thereafter the light-decomposition product is removed by treatment with a 5% trisodium phosphate solution, using a cotton swab, and washing with water. A positive diazo image is obtained which, after being sufficiently dried, is made ready for printing in the ordinary manner, for example by treating with a solution of acid salts, as described by German Patent No. 642,782, or with a 1% phosphoric acid solution. Finally, the image is rubbed in with greasy printing ink and subsequently washed with water. Alternatively, after the usual development with ink, the image may be coated with a layer of acid gum or dextrine. After removal of the gum layer, the printing foil is immediately ready for use on the printing machine. Comparatively large numbers of copies can be printed from the diazo images obtained in this manner.

Instead of a superficially oxidized aluminum foil, a superficially roughened aluminum foil or a zinc plate the surface of which has been prepared in the usual manner may be used.

Foils or plates sensitized with the above described diazo compound of Formula 1 may be stored and have excellent shelf life. After developing with trisoduim phosphate and water, the diazo images may be completely exposed to light under a carbon arc lamp without appreciably diminishing the ability to accept greasy ink. During this exposure to light the diazo compound is destroyed and the positive image is converted to a reddish-brown color.

For preparing the diazo compound condensation product, 25.2 parts of 4,4'-dihydroxy-diphenyl-sulfone are dissolved in a mixture of 200 parts of dioxane and 100 parts of distilled water and 260 parts of a 10% solution of sodium carbonate are added. A warmed solution of 60 parts of 2-diazonaphthol-(1)-5-sulfochloride (naphthoquinone-(1,2)-diazide-(2)-5-sulfochloride) dissolved in 250 parts of dioxane is then added to this mixture.

The 2-diazo-naphthol-(1)-5-sulfochloride may be obtained by the reaction of chlorosulfonic acid with 2-diazo-naphthol-(1)-5-sulfonic acid sodium salt at 50–70° C. After the combined solutions have cooled, a yellow crystalline compound separates out which is filtered off, washed with water until neutral and dried. If recrystallized from dioxane it separates out in the form of solid yellow crystals which char at about 300° C. if heated slowly.

(2) A 2% pyridine solution of the condensation product obtained from 2 moles of 2-diazonaphthol-(1)-4-sulfochloride and 1 mole of 4,4'-dihydroxy-diphenyl-sulfone (Formula 2) is applied to an aluminum or zinc plate and processed in the same manner as described in Example 1. Diazo images are obtained from which printing images can be made in the manner described.

Instead of the above mentioned condensation product the compound obtained from 2 moles of the same diazo compound and 1 mole of 1,4-dihydroxy-anthraquinone said compound corresponding with Formula 3 can be used.

(3) A 2% solution of the condensation product of 1 mole of 4,4-dihydroxy-diphenyl-sulfone, 1 mole of 2-diazo-naphthol-(1)-5-sulfochloride and 1 mole of 2-diazo-naphthol-(1)-4-sulfochloride in dioxane which condensation product corresponds with Formula 4 is used in the same manner as described in Example 1.

(4) A 2.5% dioxane solution of the condensation product derived from 2 moles of 2-diazonaphthol-(1)-5-sulfochloride and 1 mole of 1,1-bis-(4-hydroxyphenyl)-cyclohexane corresponding with Formula 5 and being prepared in a manner analogous to the method described for the diazo compound in Example 1, is whirl-coated on a superficially oxidized aluminum foil. After drying, the layer is exposed to light under a suitable pattern, and is developed with a solution of trisodium phosphate and water. Subsequently, the foil is treated with 1% phosphoric acid and colored with greasy ink. The surplus ink is removed with a cotton swab and the image side is gummed. After drying by the method ordinarily used in the lithographic process, the image is wiped using a so-called "wash-off-tincture," a solution containing asphalt which removes the greasy ink. The gummed layer is washed off by spraying vigorously with water. Thus the diazo image alone remains on the foil which may then be coated with an asphalt layer. After drying, the foil is acidified with phosphoric acid and washed with water again. The wet foil can be used for printing immediately.

Instead of the condensation product derived from 2 moles of 2-diazonaphthol-(1)-5-sulfochloride and 1 mole of 1,1-bis-(4-hydroxyphenyl)-cyclohexane, any one of the condensation products derived from 2 moles of 2-diazonaphthol-(1)-5-sulfochloride and 1 mole of 1,1-bis-(4-hydroxyphenyl)-methane (Formula 6) or 1 mole of $\beta,\beta$-bis-(4-hydroxyphenyl)-2-propane (Formula 7) or 1 mole of 4,4-dihydroxy-benzophenone (Formula 8) can be used with the same good result.

The diazo compound corresponding to Formula 8 is prepared as follows:

10.7 g. (=0.05 mole) of 4,4'-dihydroxy-benzophenone are dissolved in 150 cc. of dioxane. 29.6 g. (=0.11 mole) of naphthoquinone-(1,2)-diazide-(2)-5-sulfochloride are dissolved in 200 cc. of dioxane. To each of these solutions some animal charcoal is added, the solutions are filtered and then mixed with each other. To this mixture 300 cc. of a 10% sodium carbonate solution are slowly added over a period of about 5 minutes and while thoroughly stirring. The reaction mixture is agitated for another 15 minutes and then the brown slightly alkaline solution which has formed is mixed with 1300 cc. of 3% hydrochloric acid. The precipitate after it has separated is filtered and the surplus acid is removed from the precipitate by washing it with water.

For further purification of the compound the remainder on the filter is dissolved in 900 cc. of ethylene glycol monomethyl ether. After adding some animal charcoal to this solution it is filtered. While vigorously stirring the filtrate is given into 4 liters of 1% sodium carbonate solution. The precipitate which forms is separated by filtration and the remainder on the filter is digested with 150 cc. of 1/10 n caustic soda solution. The liquid is drawn off and the solid substance corresponding to Formula 8 is then washed free from alkali by means of water.

After drying by circulating air the substance corresponding to Formula 8 this diazo compound, when heated in a capilliary tube, melts at 138° C. with decomposition.

(5) 2 g. of the raw condensation product derived from 1 mole of 2,2',4,4'-tetrahydroxy-diphenyl and 4 moles of 2-diazonaphthol-(1)-5-sulfochloride the condensation product corresponding with Formula 9 are dissolved in 100 cc. of dioxane. After filtration this solution is whirl-coated on an aluminum foil which has been slightly roughened with a brush. After exposure to light under a transparent pattern the image is developed with a 10% disodium phosphate solution or a 3% trisodium phosphate solution and is then made ready for printing as described in Example 1 or 2.

The heretofore described water insoluble diazo compound may be replaced by the condensation product derived from 1 mole of 2,2'-4-trihydroxy-diphenyl and 3 moles of 2-diazonaphthol-(1)-5-sulfochloride corresponding with Formula 10.

For preparation of the condensation product of 2,2',4,4'-tetra-hydroxy-diphenyl and 2-diazonaphthol-(1)-5-sulfochloride 2.18 g. of tetra-hydroxy-diphenyl are dissolved in 25 cc. of dioxane; 5 cc. of water and 5 cc. of a 10% soda solution are added thereto. Subsequently, a solution of 10.8 g. of 2-diazonaphthol-(1)-5-sulfochloride in 50 cc. of dioxane is added. Then 10 cc. of water are added and finally 40 cc. of a 10% soda solution in small portions, while heating slightly until the alkaline reaction ends. The condensation product separates in an oily condition but solidifies upon the addition of water. Most of it is separated from the mother-liquor and ground. Thereafter a diluted solution of caustic soda is added until the condensation product is brought to an alkaline reaction. The condensation product is then filtered off with a suction filter, washed with water until neutral and dried. The yellow raw-product can be used immediately, but it may first be cleaned by dissolving in dioxane and carefully precipitating it with water.

The condensation product of 1 mole of 2,2',4-trihydroxy-diphenyl and 3 moles of 2-diazonaphthol-(1)-5-sulfochloride may be obtained in a similar manner.

(6) 2 g. of the condensation product derived from 1 mole of 2,3-dihydroxynaphthalene and 2 moles of 2-diazonaphthol-(1)-5-sulfochloride (Formula 11) and 0.3 g. of the azo dyestuff of the diazo compound derived from 1 mole of 2-amino-1,4-hydroquinone-diethylether and 1 mole of 2,3-dihydroxy-naphthalene are dissolved in 100 cc. of monomethylglycolether by heating to about 60° C. This solution is whirl-coated in the usual manner on an aluminum foil roughened with a brush. The plate may be heated at 95° to 100 ° C. for a few minutes to make sure that all the solvent has been removed. The base may also be coated with the solution by immersion; e.g. an aluminum strip may be passed over cylinders into the solution and subsequently through a drying chamber which is heated to 80° to 100° C. Thereafter the strip may be cut to the desired plate size. These dried aluminum plates may then be exposed to light under an original, developed with a 3% trisodium phosphate solution, washed with water and treated with 1% phosphoric acid. After washing with water the red image is ready for printing.

The colored solution to which an alkali soluble resin may be added advantageously, can also be coated on a glass plate. After exposure to light under a pattern the plate is developed in a bath of a 3% trisodium phosphate. A red copy is obtained which can subsequently be etched with hydrofluoric acid if necessary.

The condensation product is prepared as follows:

A solution of 5.4 g. of 2-diazonaphthol-(1)-5-sulfochloride in 25 cc. of dioxane is added to a solution of 1.6 g. of 2,3-dihydroxy-naphthalene in 20 cc. of dioxane. Subsequently 12 cc. of a 10% solution of caustic soda are added thereto while it is heated to room-temperature. During heating to approximately 45° C. an additional 13 cc. of a 10% solution of caustic soda are added gradually. Most of the condensation product separates out during this procedure, but a complete separation takes place after the addition of 50 cc. of water. The separated yellow product is filtered off, washed with water and dried. After recrystallization from dioxane, it is insoluble in water as well as in dilute solutions of caustic soda and acids. When heated slowly it chars gradually at temperatures above 260° C. If phloroglucinol and caustic soda are added to a solution of this product, the solution shows a violet coloring. When this solution is acidified, a red azo dyestuff separates out. If the condensation product is heated in solvents which boil at high temperature, it decomposes into a red azo dyestuff.

If images are prepared in the same manner on other metal sheets as for example brass plates, these can be used for the preparation of templates.

If 1 mole of an isomeric dihydroxy-naphthalene, for example, 2,7- or 1,7-dihydroxy-naphthalene (Formulae 12 and 13 respectively), or 1 mole of 2,2′-dihydroxy-1,1′-dinaphthylmethane (Formula 14) is condensed with 2 moles of a diazo-naphthol-sulfochloride (napthoquinone-(1,2)-diazide-sulfochloride), products are obtained which can be used in a similar manner either alone or in combination with each other.

(7) A 2% pyridine solution of the condensation product derived from 2 moles of naphthoquinone-(1,2)-diazide-(2)-5-sulfochloride and 1 mole of 1,4-dihydroxy-anthraquinone the condensation product corresponding with Formula 15 is whirl-coated on a superficially oxidized aluminum foil. After thoroughly drying the layer is exposed to light under a pattern and the image is then developed as described in Example 1.

For preparing the condensation product, 2.5 g. of 1,4-dihydroxy-anthraquinone are dissolved in 75 cc. of dioxane and 11 cc. of 10% NaOH. 5.4 g. of naphthoquinone-(1,2)-diazide-(2)-5-sulfochloride in 25 cc. of dioxane and 11 cc. of 10% NaOH. 5.4 g. of naphthoshort time in a water bath and diluted with warm water. After cooling, a yellow condensation product separates which is filtered off and washed with water. In order to clean it, it is once again agitated with a dilute warm solution of caustic soda, filtered, washed with water and dried. A yellow powder results which chars, when slowly heated, at about 286° C. This powder is difficulty soluble in the usual solvents but is more readily soluble in pyridine.

(8) 1.5 g. of 6,6′-dihydroxy-5,5′-diquinolylmethane are dissolved in a hot mixture of 20 cc. of dioxane, 5 cc. of water and 5 cc. of a 10% sodium hydroxide solution. After cooling down of the solution to room temperature 3 g. of naphthoquinone-(1,2)-diazide-(2)-5-sulfochloride dissolved in 15 cc. of dioxane are added and the mixture is reheated to about 50° C. for a short time. The reaction mixture, which is still warm, is then poured into 200 cc. of water, whereby the condensation product precipitates. This is drawn off, washed with water and dried at 40° C. The diazo compound thus obtained (Formula 16) begins to char at about 300° C.

A 1.5% solution of the compound of Formula 16 in dimethylformamide or ethylene glycol monomethyl ether is coated as usual upon a roughened aluminum foil by means of a plate whirler and then thoroughly dried. The sensitized foil is exposed under a transparent positive original. Development of the exposed foil to a positive image is effected by means of a 1 to 2 percent solution of trisodium phosphate. After development the foil is inked with greasy ink which can be applied without washing the developed plate or even without treating it with dilute phosphoric acid. It is possible to combine the inking operation and the development with trisodium phosphate solution.

The exposed plate may be developed by means of a 4.5 to 7 percent solution of phosphoric acid, to which 10% of gum arabic have been added. Such development affords a negative printing plate when the exposure is made under a positive original.

The 6,6′-dihydroxy-5,5′-diquinolyl-methane is produced as follows:

To a solution of 4 g. of 6-hydroxy-quinoline in 40 cc. of concentrated hydrochloric acid, 1.1 g. of a 40% formaldehyde are added and the mixture is heated for one hour in a steam bath. The precipitating moist crystal mass is dissolved in five times its own quantity of hot water, purified by filtering, and when still hot, neutralized by adding dilute sodium carbonate. The precipitating gray condensation product is drawn off, washed with water and dried. On dissolving in dilute soda solution and hydrochloric acid the product turns yellow and melts only when heated above 300° C.

(9) 3.4 . of 2,2′-dihydroxy-5,5′-dibenzhydryl-diphenyldicarboxylic acid and 2.7 g. of naphthoquinone-(1,2)-diazide-(2)-5-sulfochloride are dissolved in 35 cc. of dioxane. While the mixture is being stirred, as much of a 10% sodium bicarbonate solution is added dropwise to the reaction mixture as is necessary to create an alkaline reaction, even at a temperature of 50° C. When the mixture is stirred into dilute hydrochloric acid, the diazo compound (Formula 17) precipitates. It is separated and washed neutral with water. Upon recrystallization from glacial acetic acid to which some dioxane has been added the product decomposes at about 233–235° C.

A roughened aluminum plate is coated by means of a plate whirler with a 1.5% solution of this compound in glycol monomethyl ether. After the foil has been thoroughly dried, it is exposed under a transparent original. On developing the exposed foil with a 3% trisodium phosphate solution a positive image is obtained. The plate is then rinsed with water, treated with a 1% phosphoric acid solution and inked with greasy ink.

(10) 5.5 g. of naphthoquinone-(1,2)-diazide-(2)-4-sulfochloride and 1.5 g. of 1,3,5-resorcylic acid are dissolved in a mixture consisting of 60 cc. of dioxane and 10 cc. of water. About 25–35 cc. of a 10% sodium bicarbonate solution are added drop by drop to said solution while stirring the reaction mixture. When the reaction is completed, the mixture is poured into dilute hydrochloric acid, whereupon the diazo compound (Formula 18) precipitates. The yellow product is drawn off and washed neutral with water. By dissolving the diazo compound in glacial acetic acid and addition of water to the solution, it is purified. It turns brown when heated to 240° C. and starts to char and decompose slowly towards 260° C.

A 1.5% solution of this compound in glycol monomethyl ether is coated on a roughened aluminum foil by means of a plate whirler, and the coated foil is then thoroughly dried. It is exposed behind a transparent positive pattern. On developing the exposed foil with a buffer solution consisting of a 1:5 mixture of a 5% aqueous monosodium phosphate solution and a 5% disodium phosphate solution a positive image is obtained which is rinsed with water, treated with 1% phosphoric acid and inked with greasy ink.

(11) 50.7 parts by weight of 2,4,6-tri-(4′-hydroxy-naphthyl)-1,3,5-triazine (German Patent DRP No. 453,-100) are dissolved in 1000 parts by volume of dioxane, 80.6 parts by weight of naphthoquinone-(1,2)-diazide-(2)-5-sulfochloride dissolved in 500 parts by volume of dioxane are added, and the mixture is stirred for 5 hours at room temperature in the presence of potassium carbonate. The alkaline solution is then diluted with water and heated for 30 minutes to 40° C. The precipitate is drawn off and washed neutral with water. The condensation product (Formula 19) is purified by dissolving it in dioxane and adding water to the dioxane solution. The compound melts not under 300° C.

A 1% solution of this compound in dioxane is coated on a roughened aluminum foil by means of a plate whirler. The coated foil is carefully dried and then exposed under a transparent positive original. A positive image is obtained by developing the exposed foil with a 5% trisodium phosphate solution. The plate is then rinsed with water, treated with a 3% solution of phosphoric acid and inked with greasy ink.

(12) Processed paper for making paper printing foil, such as the paper manufactured in accordance with U.S. Patent No. 2,534,588 and sold by S.D. Warren Company, of Cumberland Mills, Maine, is coated on its layer side with a 2% solution of the compound corresponding to formula 14 in ethylene glycol monomethyl ether and then dried by means of a current of hot air. The paper sheet thus sensitized is then exposed for about one minute under a positive transparent master, using as the light source e.g., an arc lamp of 18 amps. at a distance of 70 cm. For developing the exposed layer a 5% trisodium phosphate solution is used. The developed foil is wiped over first with water and then with a solution containing phosphoric acid and glycerine. Subsequently it is inked with greasy ink. Thus from a positive master a positive printing plate is obtained.

(13) Paper suitable for the production of a paper printing foil, e.g. the one, produced by S. D. Warren Company, of Cumberland Mills, Maine, is precoated with a 2% aqueous ferric sulfate solution. The excess solution is wiped off with a doctor blade and the paper is then dried. By plate whirling the dried paper foil is coated with a solution containing in 100 cc. of ethylene glycol monomethyl ether 2 g. of the diazo compound of the Formula 14. Subsequently the coated paper foil is dried by a current of warm air. The paper foil which has now become light-sensitive is exposed under a positive original, using e.g., an arc lamp. The exposed paper is then developed with a 5% aqueous solution of trisodium phosphate. A positive offset printing plate is obtained. Adequate solutions of other salts of heavy metals, e.g. of aluminum sulfate or zinc sulfate can be used instead of the above mentioned aqueous solutions of ferric sulfate.

(14) A brushed aluminum foil is coated with a 1.5% solution of the diazo compound corresponding to Formula 20 in ethylene glycol monomethyl ether and then dried with a current of hot air. The light-sensitive foil thus obtained is exposed under a positive master and then developed by means of a 5% aqueous solution of trisodium phosphate. The developed foil is subsequently rinsed with water, swabbed with a 10% aqueous solution of gum arabic containing also 1% of phosphoric acid, and finally inked with greasy ink. A positive printing plate is obtained.

The compound corresponding to Formula 20 is prepared as follows:

23 g. (1/10 mole) of 2,3,4-trihydroxy-benzophenone are dissolved in 150 cc. of dioxane and to this solution there is added some animal charcoal. The solution is filtered (filtrate I).

89 g. (3/10 mole) of naphthoquinone-(1,2)-diazide-(2)-5-sulfonic acid chloride are dissolved in 450 cc. of dioxane and to this solution there is added some animal charcoal. The solution is filtered (filtrate II).

Filtrates I and II are mixed and, while constantly stirring, 500 cc. of a 10% sodium carbonate solution are slowly added to the mixture over a period of 3 minutes. The yellow-brown solution, on the surface of which a brown oil separates, shows distinct alkaline reaction. After addition of the sodium carbonate solution, the reaction mixture is stirred for another 15 minutes at room temperature. Subsequently, it is first acidified by adding 100 cc. of a 15% hydrochloric acid and then diluted by adding 1500 cc. of water. The diazo compound is obtained in the form of a yellow precipitate. This precipitate is separated from the liquid by filtration and then washed with water in order to remove surplus hydrochloric acid.

The yellow compound thus obtained is agitated for about 14 hours in 500 cc. of a 5% disodium phosphate solution, then the liquid is removed by filtration and the remainder on the filter is washed with water. The yellow compound is then entered into 450 cc. of ethyl alcohol and agitated for 2½ hours. After filtering the remainder on the filter is washed two or three times with ethyl alcohol. Then the yellow remainder is suspended in water and filtered again. The thus purified remainder is washed with water. Washing is continued until the water (filtrate) is absolutely colorless. After drying the compound by circulating air, it is recrystallized from benzene. The compound thus obtained is of a golden-yellow color and dissolves in ethylene glycol monomethyl ether, dioxane, dimethyl formamide and acetone. It is only difficultly soluble in benzene and practically insoluble in ethanol, methanol and dilute aqueous alkalies. In a test to ascertain its melting point it decomposes at 333° C. The test of the absorption spectrum of an ethylene glycol monomethyl ether solution of the diazo compound shows maxima at wave lengths of 3550 A. and 4000 A. and a minimum at 3000 A.

The ethylene glycol monomethyl ether solution used for coating the aluminum foil may contain, instead of 1.5% of the diazo compound corresponding to Formula 20, the same quantity of the diazo compound corresponding to Formula 21. The printing plate produced from this light-sensitive foil is of the same quality.

The diazo compound corresponding to Formula 21 is prepared as follows:

10.5 g. (1/20 mole) of 2,4-dihydroxybenzophenone and 27 g. (1/10 mole) of naphthoquinone-(1,2)-diazide-(2)-5-sulfochloride are dissolved in 300 cc. of dioxane, and, while stirring vigorously, 130 cc. of a saturated sodium bicarbonate solution are quickly added to the solution. The dark brown colored reaction mixture shows a weakly alkaline reaction and, upon addition of 300 cc. of water a resinous brown mass precipitates. The mother lye is drawn off and the resin obtained is mixed with water. A yellow colored raw product is obtained, which is separated by filtration, washed with water, and then dissolved in 500 cc. of ethylene glycol monomethyl ether. After filtering the solution over animal charcoal, it is entered into 5 liters of a 5% sodium carbonate solution having a temperature of 50° C. The yellow bisester corresponding to Formula 21 which precipitates is separated by filtration, washed with water and dried. When heated in a capillary tube the compound corresponding to Formula 21 decomposes at 136° C.

This application is a continuation-in-part of application Serial No. 472,224, filed November 30, 1954, which application is, in turn, a continuation-in-part of application Serial No. 202,403, filed December 22, 1950, and now abandoned.

What is claimed is:

1. A compound having the formula

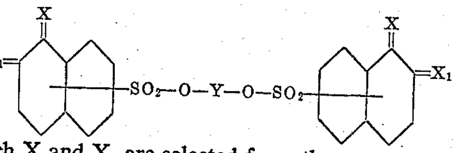

in which X and $X_1$ are selected from the group consisting of $N_2$ and O, those attached to the same ring being different, and Y is an arylene group.

2. A compound having the formula

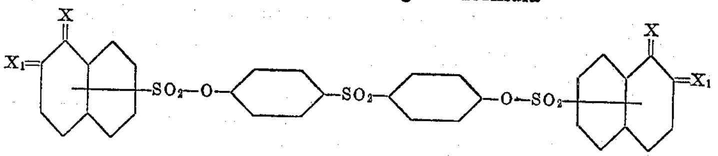

in which X and $X_1$ are selected from the group consisting of $N_2$ and O, those attached to the same ring being different.

3. A compound having the formula

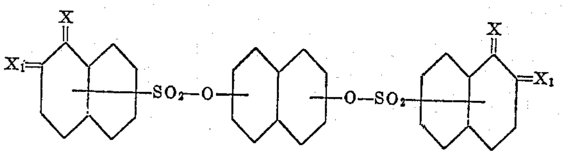

in which X and $X_1$ are selected from the group consisting of $N_2$ and O, those attached to the same ring being different.

4. A compound having the formula

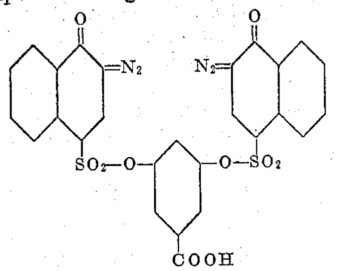

5. A compound having the formula

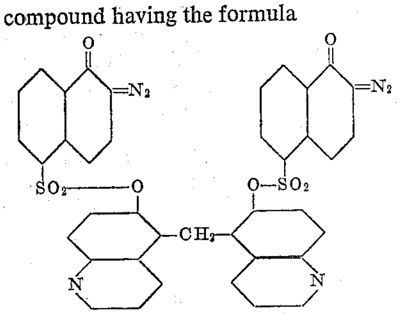

6. A compound having the formula

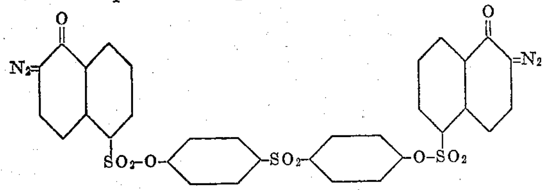

7. A compound having the formula

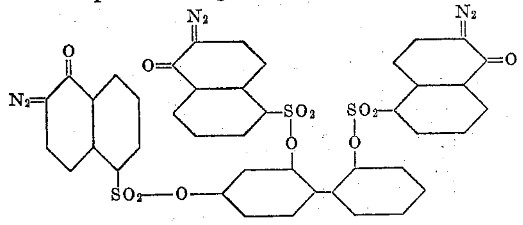

8. A compound having the formula

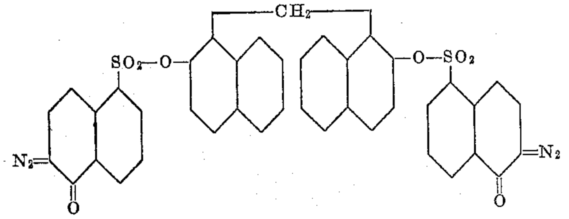

9. A presensitized printing plate comprising a base material having a coating thereon comprising a compound having the formula

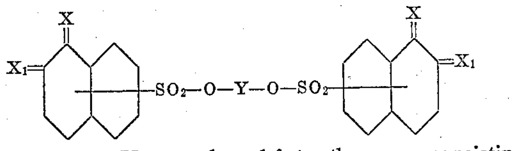

in which X and $X_1$ are selected from the group consisting of $N_2$ and O, those attached to the same ring being different, and Y is an arylene group.

10. A presensitized printing plate comprising a base material having a coating thereon comprising a compound having the formula

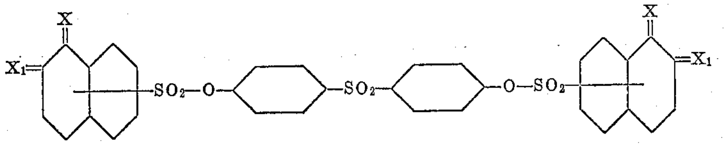

in which X and $X_1$ are selected from the group consisting of $N_2$ and O, those attached to the same ring being different.

11. A presensitized printing plate comprising a base material having a coating thereon comprising a compound having the formula

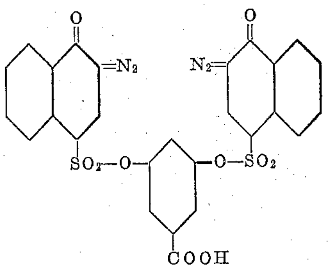

12. A presensitized printing plate comprising a base material having a coating thereon comprising a compound having the formula

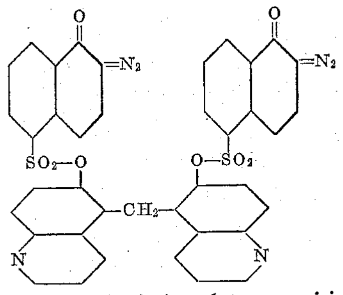

13. A presensitized printing plate comprising a base material having a coating thereon comprising a compound having the formula

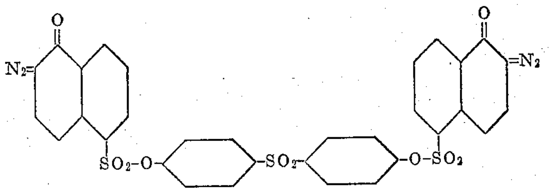

14. A presensitized printing plate comprising a base material having a coating thereon comprising a compound having the formula

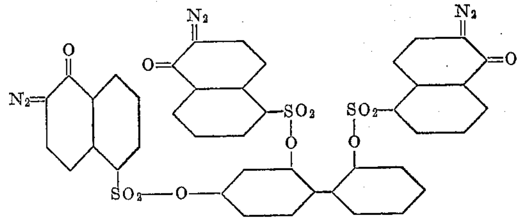

15. A presensitized printing plate comprising a base material having a coating thereon comprising a compound having the formula

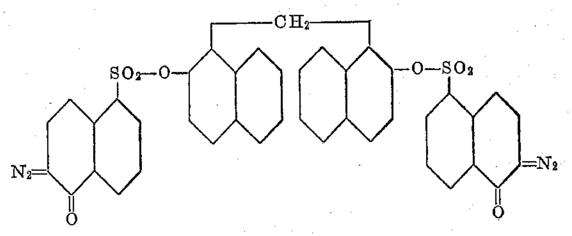

16. A process for developing a printing plate which comprises exposing to light under a master a plate having a compound thereon of the formula

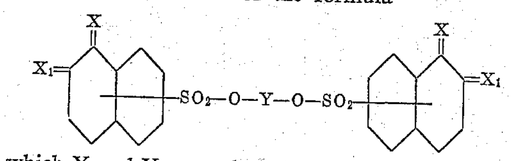

in which X and $X_1$ are selected from the group consisting of $N_2$ and O, those attached to the same ring being different, and Y is an arylene group; to thereby form a decomposition product in the light struck areas and removing the decomposition product by treatment with a weakly alkaline solution.

17. A process for developing a printing plate which comprises exposing to light under a master a plate having a compound thereon of the formula

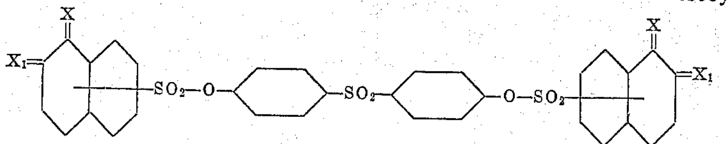

in which X and $X_1$ are selected from the group consisting of $N_2$ and O, those attached to the same ring being different; to thereby form a decomposition product in the light struck areas and removing the decomposition product by treatment with a weakly alkaline solution.

18. A process for developing a printing plate which comprises exposing to light under a master a plate having a compound thereon of the formula

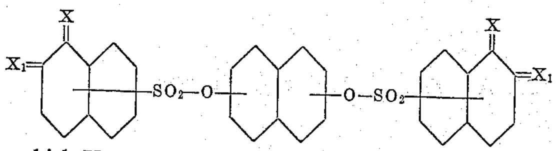

in which X and $X_1$ are selected from the group consisting of $N_2$ and O, those attached to the same ring being different; to thereby form a decomposition product in the light struck areas and removing the decomposition product by treatment with a weakly alkaline solution.

19. A process for developing a printing plate which comprises exposing to light under a master a plate having a compound thereon of the formula

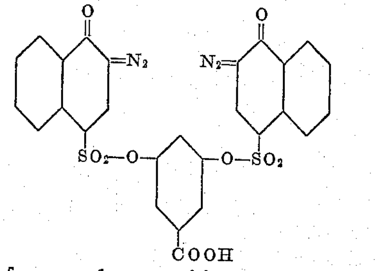

to thereby form a decomposition product in the light struck areas and removing the decomposition product by treatment with a weakly alkaline solution.

20. A process for developing a printing plate which comprises exposing to light under a master a plate having a compound thereon of the formula

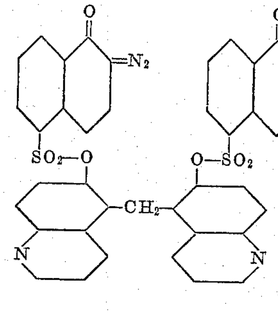

to thereby form a decomposition product in the light struck areas and removing the decomposition product by treatment with a weakly alkaline solution.

21. A process for developing a printing plate which comprises exposing to light under a master a plate having a compound thereon of the formula

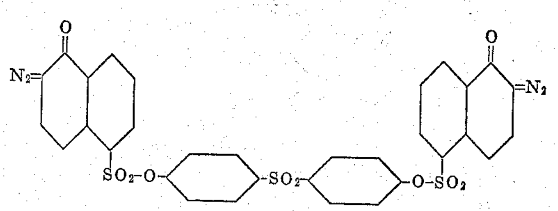

to thereby form a decomposition product in the light struck areas and removing the decomposition product by treatment with a weakly alkaline solution.

22. A process for developing a printing plate which comprises exposing to light under a master a plate having a compound thereon of the formula

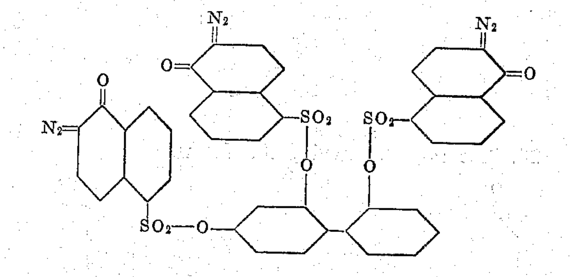

to thereby form a decomposition product in the light struck areas and removing the decomposition product by treatment with a weakly alkaline solution.

23. A process for developing a printing plate which comprises exposing to light under a master a plate having a compound thereon of the formula

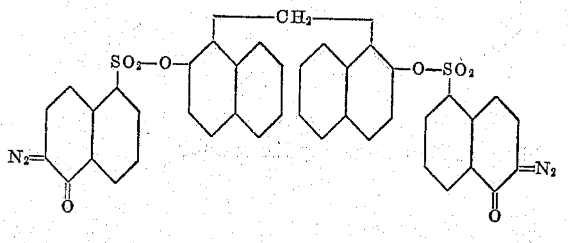

to thereby form a decomposition product in the light struck areas and removing the decomposition product by treatment with a weakly alkaline solution.

24. A compound having the formula

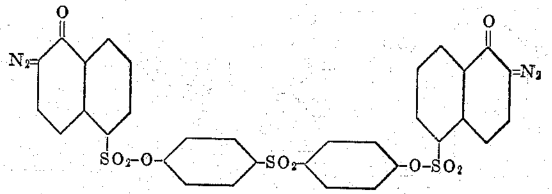

25. A compound having the formula

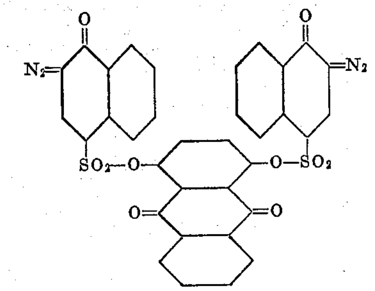

26. A compound having the formula

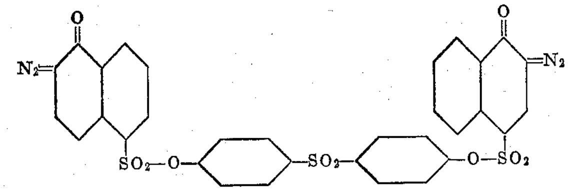

27. A compound having the formula

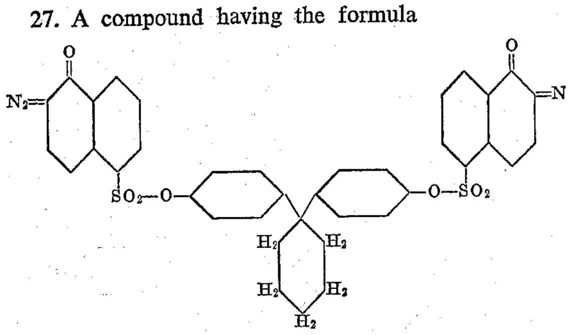

28. A compound having the formula

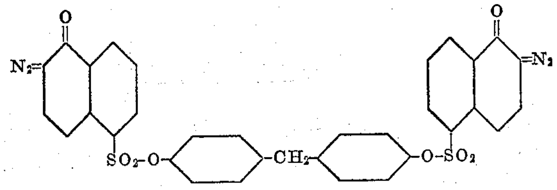

29. A compound having the formula

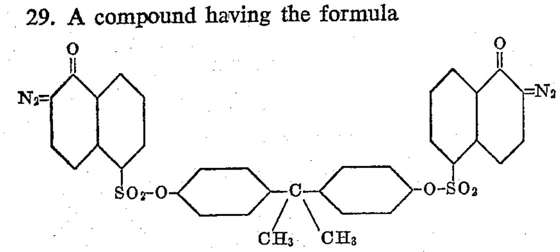

30. A compound having the formula

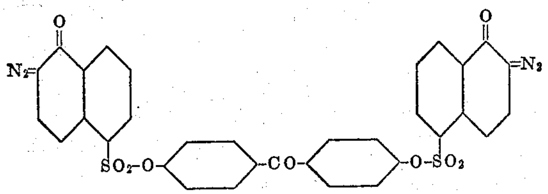

31. A compound having the formula

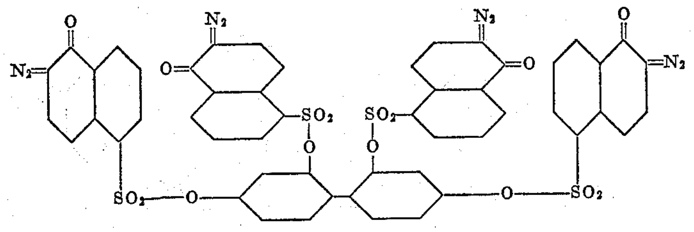

32. A compound having the formula

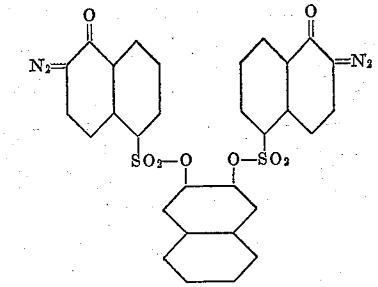

33. A compound having the formula

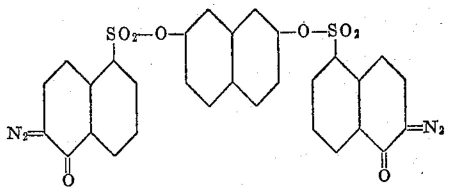

34. A compound having the formula

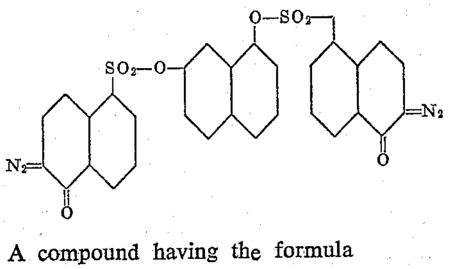

35. A compound having the formula

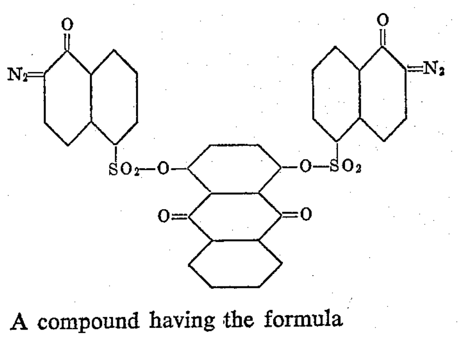

36. A compound having the formula

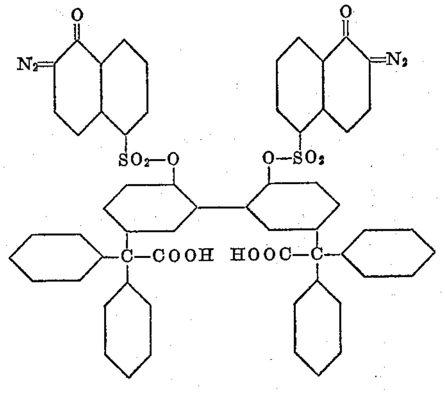

37. A compound having the formula

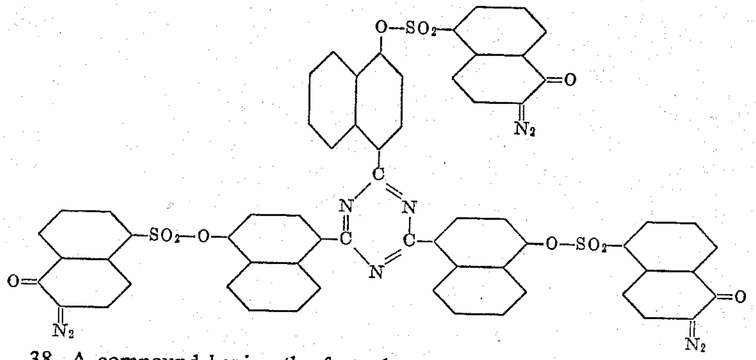

38. A compound having the formula

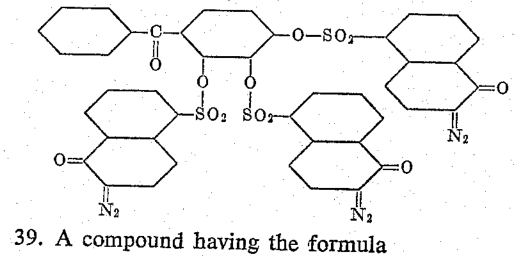

39. A compound having the formula

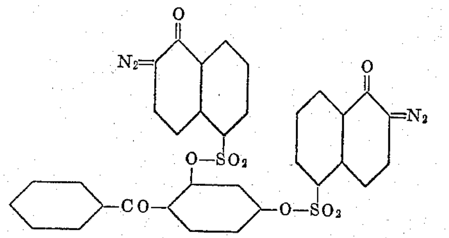

40. A presensitized printing plate according to claim 9 in which the compound is in admixture with an alkali-soluble resin.

41. A process according to claim 16 in which the compound is in admixture with an alkali-soluble resin.

42. A presensitized printing plate comprising a base material having a coating thereon comprising a compound having the formula

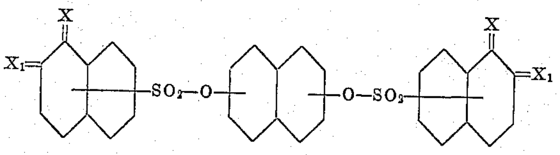

in which X and $X_1$ are selected from the group consisting of $N_2$ and O, those attached to the same ring being different.

References Cited in the file of this patent

UNITED STATES PATENTS

| | | |
|---|---|---|
| 2,702,243 | Schmidt | Feb. 15, 1955 |

FOREIGN PATENTS

| | | |
|---|---|---|
| 865,109 | Germany | Jan. 29, 1953 |
| 872,154 | Germany | Mar. 30, 1953 |